United States Patent
Obeng et al.

(10) Patent No.: US 6,818,301 B2
(45) Date of Patent: Nov. 16, 2004

(54) THERMAL MANAGEMENT WITH FILLED POLYMERIC POLISHING PADS AND APPLICATIONS THEREFOR

(75) Inventors: Yaw S. Obeng, Orlando, FL (US); Edward M. Yokley, Penbroke Pines, FL (US)

(73) Assignee: PsiloQuest Inc., Orlando, FL (US)

(*) Notice: Subject to any disclaimer, the term of this patent is extended or adjusted under 35 U.S.C. 154(b) by 305 days.

(21) Appl. No.: 10/090,397

(22) Filed: Mar. 4, 2002

(65) Prior Publication Data

US 2003/0031876 A1 Feb. 13, 2003

Related U.S. Application Data

(60) Provisional application No. 60/295,315, filed on Jun. 1, 2001, and provisional application No. 60/304,375, filed on Jul. 10, 2001.

(51) Int. Cl.$^7$ .................. B32B 9/04; B32B 17/10; B32B 27/00; B32B 27/36; B32B 27/40
(52) U.S. Cl. .................. 428/411.1; 428/412; 428/423.1; 428/425.9; 428/436; 428/474.4; 428/475.5; 428/480; 428/492; 428/500; 428/524
(58) Field of Search ................ 428/411.1, 412, 428/423.1, 425.9, 436, 474.4, 475.5, 480, 492, 500, 524

(56) References Cited

U.S. PATENT DOCUMENTS

| | | | |
|---|---|---|---|
| 1,338,647 A | 4/1920 | Gamer et sl. | |
| 4,446,254 A | 5/1984 | Nakae et al. | |
| 4,613,345 A | 9/1986 | Thicke et al. | |
| 4,852,646 A | 8/1989 | Dittmer et al. | |
| 4,946,903 A | 8/1990 | Gardella, Jr. et al. | |
| 5,461,101 A | 10/1995 | Rothon et al. | |
| 5,510,174 A * | 4/1996 | Litman | 442/151 |
| 5,516,400 A | 5/1996 | Pasch et al. | |
| 5,733,176 A | 3/1998 | Robinson et al. | |
| 5,945,486 A | 8/1999 | Vargo et al. | |
| 6,017,265 A | 1/2000 | Cook et al. | |
| 6,063,306 A | 5/2000 | Kaufman et al. | |
| 6,083,838 A | 7/2000 | Burton et al. | |
| 6,106,754 A | 8/2000 | Cook et al. | |
| 6,126,532 A | 10/2000 | Sevilla et al. | |
| 6,132,298 A | 10/2000 | Zuniga et al. | |
| 6,150,271 A | 11/2000 | Easter et al. | |
| 6,231,942 B1 | 5/2001 | Blizard et al. | |
| 6,267,644 B1 | 7/2001 | Molnar | |
| 6,283,829 B1 | 9/2001 | Molnar | |
| 6,290,589 B1 | 9/2001 | Tolles | |
| 6,291,349 B1 | 9/2001 | Molnar | |
| 6,293,851 B1 | 9/2001 | Molnar | |
| 6,346,202 B1 | 2/2002 | Molnar | |
| 6,354,915 B1 | 3/2002 | James et al. | |
| 6,413,153 B1 | 7/2002 | Molar | |
| 6,419,556 B1 | 7/2002 | Urbanavage et al. | |
| 6,428,388 B2 | 8/2002 | Molnar | |
| 6,435,948 B1 | 8/2002 | Molnar | |
| 6,579,604 B2 * | 6/2003 | Obeng et al. | 428/319.3 |
| 6,596,388 B1 * | 7/2003 | Obeng et al. | 428/305.5 |
| 6,659,846 B2 * | 12/2003 | Misra et al. | 451/41 |

FOREIGN PATENT DOCUMENTS

| | | |
|---|---|---|
| EP | 0 884 349 A1 | 12/1998 |
| JP | 2002036098 | 2/2002 |
| WO | WO 9605602 A1 | 2/1996 |

OTHER PUBLICATIONS

Hawler's Condensed Chemical Dictionary, Thirteenth Edition, Copyright 1997 by John Wiley & Sons, Inc., Electrochemical Society (ECS), Elastometer, p. 437.

* cited by examiner

Primary Examiner—Nathan M. Nutter

(57) ABSTRACT

The present invention is directed, in general, to a method of planarizing a surface on a semiconductor wafer and, more specifically, to a method of altering the properties of polishing pads to improve thermal management during chemical-mechanical planarization, the resulting heat conductive pad and a polishing apparatus that includes the pad. The pad includes a polishing body composed of a thermoconductive polymer comprising an substrate and filler particle containing a Group II salt and within the substrate.

21 Claims, 2 Drawing Sheets

THERMAL MANAGEMENT WITH FILLED POLYMERIC POLISHING PADS AND APPLICATIONS THEREFOR

CROSS-REFERENCE TO PROVISIONAL APPLICATION

This application claims the benefit of U.S. Provisional Application 60/295,315 entitled, "A METHOD OF ALTERING PROPERTIES OF A POLISHING PAD AND SPECIFIC APPLICATIONS THEREFOR," to Yaw S. Obeng and Edward M. Yokley, filed on Jun. 1, 2001; and U.S. Provisional Application 60/304,375 entitled, "A METHOD OF ALTERING PROPERTIES OF A THERMOPLASTIC FOAM POLISHING PAD AND SPECIFIC APPLICATIONS THEREFOR," to Yaw S. Obeng and Edward M. Yokley, filed on Jul. 10, 2001, which are commonly assigned with the present invention and incorporated herein by reference as if reproduced herein in its entirety.

TECHNICAL FIELD OF THE INVENTION

The present invention is directed, to polishing pads used for creating a smooth, ultra-flat surface on such items as glass, semiconductors, dielectric/metal composites, magnetic mass storage media and integrated circuits. More specifically, the present invention relates to the transformation of thermal conductive properties to create more suitable polishing pads.

BACKGROUND OF THE INVENTION

Chemical-mechanical polishing (CMP) is used increasingly as a planarizing technique in the manufacture of VLSI integrated circuits. Although it has the potential for planarizing a variety of materials in IC processing, CMP is used most widely for planarizing metallizied layers and interlevel dielectrics on semiconductor wafers, and for planarizing substrates for shallow trench isolation.

There are three critical consumable components in the CMP process. The first is the abrasive liquid slurry. The abrasive liquid slurry's composition must be altered, and special formulations must be produced for each different substrate being polished. For example, some substrates require a high pH to be activated for polishing, while other substrates need a more acidic environment. Still other substrates respond best to silica abrasives, while others require alumina or titanium abrasive particles. The second critical consumable component in the CMP process is the polishing pad. It must be very flat, uniform across its entire surface, and resistant to the chemical nature of the slurry and have the right combination of stiffness and compressibility to minimize effects like dishing and erosion. A third critical consumable component in the CMP process is the carrier film. The carrier film attached the wafer to its rotating holder must have an adequate flatness, be uniform in its thickness, have adhesive properties that will hold it tightly to the carrier but not too tightly to the wafer, and be immune to the chemical environment in which it works.

During conventional CMP of metal stacks, an oxidant is used to convert the top metal to metal oxides. These metal oxides are subsequently abraded in situ with harder metal oxide abrasives. The oxidation of the top metal is invariably an exothermic process, which leads to enhanced process temperatures. Thus, in addition to the heat from the frictional forces inherent in CMP, heat is also generated from the oxidation of the metallic film.

During metal CMP, areas dense in features (i.e., alignment marks) tend to erode at a faster rate than areas with sparse distributions. This uncontrollable erosion of the metals forming the alignment marks is commonly referred to as oxide erosion. Additionally, manufacturers have observed that oxide erosion in dense arrays increase dramatically as batch sizes are increased.

As noted above, heat is a byproduct of the oxidation process. Increased temperatures affect the mechanical properties of the metal oxide film by making films easier to abrade. But the resulting enhanced abrasion rate results in recessed metal plugs that are separated by thin oxide walls that rapidly collapse with polishing, thereby leading to oxide erosion. It has been found that a reduction in temperature reduces the solubility of by-products, which correspondingly reduces the oxide erosion.

Based on observations of variations in polishing rates it was concluded that the polishing rate differential across a wafer was primarily due to temperature variations across the wafer during the polishing operation. These temperature variations may result from: 1) non-uniformities in the heat transfer characteristics of the wafer carrier, 2) accelerated chemical reactions due to non-uniform reactant concentrations, 3) non-uniform heating of the slurry, or 4) non-uniform heating of the wafer itself due to differences in the amount and duration of friction generated between different parts of the wafer being polished. These effects do not necessarily have a pattern, although isotherms may develop in a circular pattern due to the rotation of the wafer. In such instances, the temperature gradients therefore typically have a radial pattern.

Several approaches have been proposed to address these deficiencies in the art. Tight temperature control of the polishing platen has been proposed as a means to control excessive heating. However, this does not address or resolve problems due to temperature variations across the surface of the substrate during polishing. Moreover, the polishing pad is typically a layered polymer materials with layers having different hardness, depending on the CMP process being used, and the material being removed from the wafer. And, because these pads are thermally insulating, they do not efficiently conduct away the unwanted heat from the process, even when the polishing platen is cooled.

An alternative approach is to use a temperature controlled wafer carrier for CMP. The wafer carrier comprises a polishing head having a circular recess with cooling coils embedded in the polishing head situated close to the recess. The coils allow coolant to circulate through the wafer carrier. This reduces temperature gradients by providing local temperature control means in the head of the wafer carrier.

Another approach is to planarize a surface on a semiconductor wafer containing metal with reduced temperature slurries. This provides a method in which the rate of oxidation is reduced to inhibit uncontrolled oxide formation. The reduced slurry temperature also reduces the solubility of the process by-products in the slurry thus passivating dielectric surfaces against erosion.

Yet another approach involves modifying the surface of CMP pads materials to improve the wetability of the pad surface and the adhesion of surface coatings, thereby increasing the application performance of these materials. Plasma treatment of polishing pad materials is one means to functionalize and thereby modify polishing pad surfaces. However, the functionalization of pad surfaces by plasma treatment is subject to post-treatment surface energy hysteresis and the spontaneous return to low surface energy conditions after a short period.

Not withstanding the foregoing attempts at thermal management, the problem of effective thermal management still persists in the art. Accordingly, what is needed in the art are materials and methods for controlled and predictable thermal management and the dissipation of heat generated from the friction and chemical events inherent in the polishing process.

SUMMARY OF THE INVENTION

To address the deficiencies of the prior art, the present invention, in one embodiment, provides a heat conductive polishing pad for chemical-mechanical polishing. The pad comprises a polishing body including a thermoconductive polymer having a substrate with filler particles contained therein. The filler particles contain a Group II salt.

In another embodiment, the present invention provides a method for preparing a heat conductive plastic polishing pad for chemical-mechanical polishing. The method comprises providing a substrate, blending filler particles containing a Group II salt into the substrate to thereby produce a thermoconductive polymer. The method further includes forming a polishing body from the thermoconductive polymer suitable for polishing a semiconductor wafer or integrated circuit.

Yet another embodiment provides a polishing apparatus. The apparatus comprises a mechanically driven carrier head, a polishing platen and a polishing pad attached to the polishing platen. The carrier head is positionable against the polishing platen to impart a polishing force against the polishing platen. The polishing pad includes a polishing body comprising a thermoconductive polymer having a substrate with filler particles containing a Group II salt as described above.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
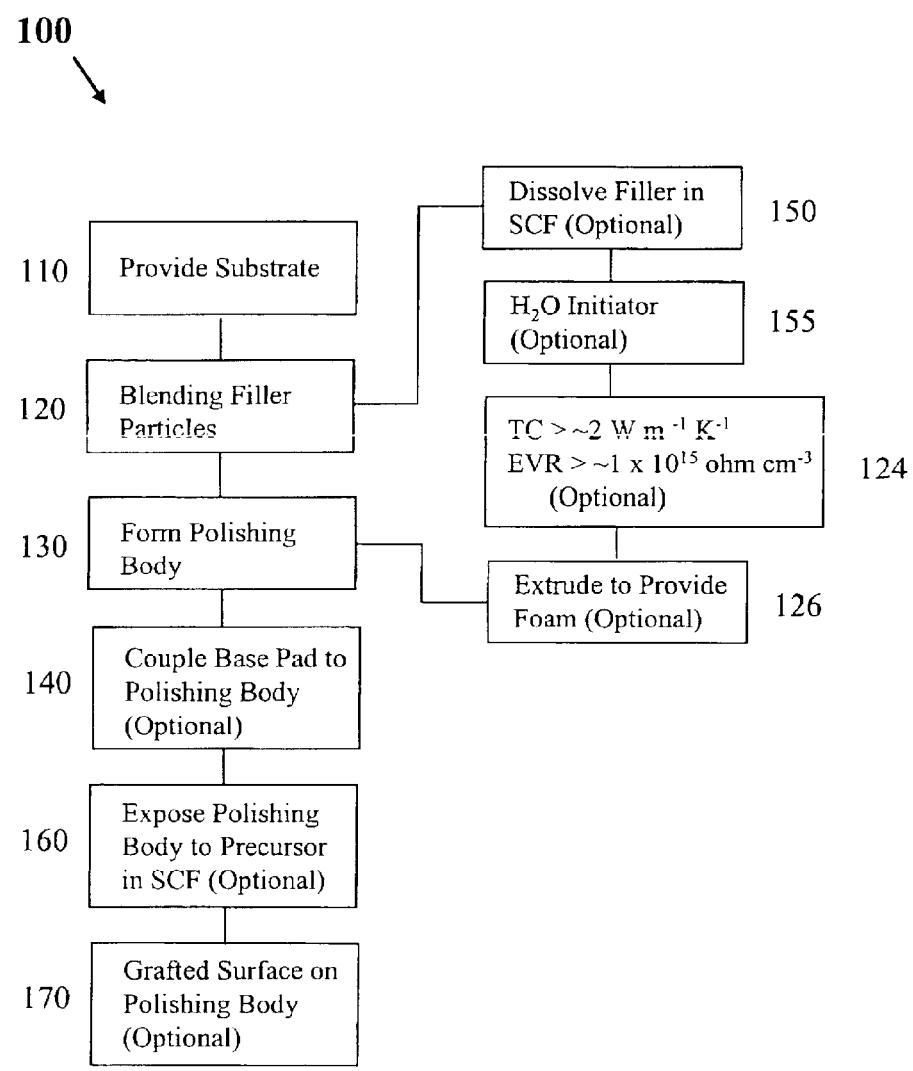
FIG. 1 illustrates a method for preparing a heat conductive polishing pad according to the present invention.

Although heat conductive materials have been incorporated into polymers, no applications have been previously contemplated for CMP or related technologies. Thus, one embodiment of the present invention provides a heat conductive polishing pad for CMP applications. The pad comprises a polishing body including a thermoconductive polymer having a substrate with filler particles. The filler particles, containing a Group II salt, are incorporated within the substrate. For example, a Group II salt may be any cationic form of an element included in Group II of the Periodic Table, for example, Magnesium (II), associated with any compatible anion, for example, Oxide. Because the pads of the present invention have higher thermal conductivity as compared to conventional polishing pads, there is improved dissipation of heat generated from the friction and exothermic chemical events inherent in the polishing process. Moreover, the selective incorporation of certain types, amounts, shapes and sizes of the filler particles may be used to control thermal management during polishing.

In one preferred embodiment, the polishing body further includes a base pad and the thermoconductive polymer forms a polishing surface located over the base pad. For example, the thermoconductive polymer should have a thermal conductivity of greater than about 1 Watt $m^{-1}$ $K^{-1}$, preferably greater than about 5 Watts $m^{-1}$ $K^{-1}$, and most preferably greater than about 15 Watts $m^{-1}$ $K^{-1}$ to about 20 Watts $m^{-1}$ $K^{-1}$. In addition to having high thermal conductivity, to avoid deleterious effects on the function of transistors or other electrical components located on a semiconductor wafer to be polished, such as short circuits, the polishing body also should be electrically neutral or nonconducting. For example, the thermoconductive polymer should have an electrical volume resistivity of greater than about $1\times10^{15}$ ohm $cm^{-3}$ at 25° C., preferably greater than about $5\times10^{15}$ ohm $cm^{-3}$ at 25° C. Additionally, in certain preferred embodiments, the thermoconductive polymer is stable in the pH range of about 2 to about 12. The term stable as used herein means that the thermoconductive polymer, when incorporated into a polishing device, does not show visual signs of decomposing in the CMP slurry, nor fray or fragment during use. Additionally, the thermoconductive polymers are not subject to piezochromic effects. Thus, pressure loads associated with CMP do not substantially affect the polymer's thermoconductive properties. Such pressure loads, for example, may range from about 0.1 psi to about 50 psi, preferably about 0.5 to about 10 psi, more preferably about 1 psi to about 8 psi.

The substrate may be any polymer used in polishing pads for CMP applications, and compatible with the incorporation of filler particles throughout. For example, in certain preferred embodiments the substrate may be composed of polyurethane, polyolefin or polyvinyl ester. Alternative embodiments of the substrate may be, for example, polyurea, polycarbonate, aliphatic polyketone, polysulfone, aromatic polyketone, 6,6 nylon, 6,12 nylon or polyamide. In other embodiments, the substrate may be thermoplastic rubber or melt-processable rubber. However, embodiments where the substrate is composed of closed-cell polypropylene, polyethylene, crosslinked polyethylene, ethylene vinyl acetate, or polyvinylacetate are also within the scope of the present invention.

In other alternative embodiments of the present invention, the surface of the thermoconductive polymer incorporated into the polishing body produced as described above may be further modified to improve the selectivity and performance of polishing pads formed therefrom. For example, an embodiment comprising a thermoplastic foam substrate, comprising the above described thermoconductive polymer, may have a modified surface and a grafted surface on the modified surface. This polymer is produced, for example, by subjecting the thermoplastic foam substrate to a first plasma treatment to produce a modified surface. The methods and processes for producing such modified surface are more fully described in U.S. Provisional Application 60/295,315, which is incorporated herein by reference.

The excited state sites generated by exposing thermoconductive polymers, such as thermoplastic foam polymers, to the initial plasma reactant are thought to provide an attractive base on which to selectively graft numerous inorganic and organic precursor materials. This allows the grafting of various functional groups, or grafted compounds, onto the thermoconductive polymer's modified surface in a second plasma treatment. Such surface modified polymers of the present invention may thus have enhanced selectivity for certain CMP applications.

Alternatively, such materials may also be incorporated throughout the thermoconductive polymer incorporated into the polishing body, by dissolving the precursor in a supercritical fluid, as further described below. Such thermoconductive thermoplastic foam polymers based polishing bodies may thus contain grafted functional groups that change the nanoscale morphology of a pad surface, while leaving the bulk properties of the supercritical fluid treated thermoconductive polymer relatively intact, or modified by additional processes as described below.

One group of grafted compounds may include oxygen-containing organometallic reactants that incorporate an inorganic metal oxide throughout the thermoconductive polymer. In such embodiments, the precursors typically include a transition metal, such as titanium, manganese, or tantalum. However, any metal element capable of forming an oxygen containing organometallic compound, being dissolved in a supercritical fluid and capable of being incorporated into the substrate, is suitable. Silicon may also be employed as the metal portion of the organometallic precursor reagent. In these embodiments, the organic portion of the organometallic reagent may be an ester, acetate, or alkoxy fragment. The precursor reagent may optionally include ozone, alkoxy silanes, water, ammonia, alcohols, mineral sprits or hydrogen peroxide. For example, in preferred embodiments, the grafted compound may be formed from precursors composed of titanium esters, tantalum alkoxides, including tantalum alkoxides wherein the alkoxide portion has 1–5 carbon atoms; manganese acetate solution in water; manganese alkoxide dissolved in mineral spirits; manganese acetate; manganese acetylacetonate; aluminum alkoxides; alkoxy aluminates; zirconium alkoxides, wherein the alkoxide has 1–5 carbon atoms; alkoxy zirconates; magnesium acetate; and magnesium acetylacetonate. Other embodiments are also contemplated for the grafted compound being formed from precursors composed of, for example, alkoxy silanes and ozone, alkoxy silanes and ammonia, titanium esters and water, titanium esters and alcohols, or titanium esters and ozone.

Another group of grafted compounds may be super hydrated, for imparting controlled wetability and designed alkalinity properties. In such instances, the thermoconductive polymer has preferably already been foamed, for example, by using a supercritical fluid as a foaming agent. Thus, the polymer has a foam structure and the grafted compound includes a controlled wetability compound. As noted above, in such instances, an initiator may not be required. In preferred embodiments, the grafted compounds may be formed from precursors composed of water, aliphatic alcohols, or aliphatic polyalcohols. In other embodiments, the grafted compounds may be formed from precursors composed of hydrogen peroxide, ammonia, or oxides of nitrogen. Yet other embodiments include hydroxylamine solution, hydrazine, sulfur hexafluoride as the precursor. One skilled in the art, however, will recognize that other similar materials, including other organic alcohols or polyalcohols, may produce the desired properties when grafted into the polymer, and thus, are within the scope of the present invention.

Yet another group of grafted compounds may include organic compounds. For example, in preferred embodiments, the grafted compounds may be formed from precursors composed of allyl alcohols; allyl amines; allyl alkylamines, where the alkyl groups contain 1–8 carbon atoms; allyl ethers; secondary amines, where the alkyl groups contain 1–8 carbon; alkyl hydrazines, where the alkyl groups contain 1–8 carbon atoms; acrylic acid; methacrylic acid; acrylic acid esters containing 1–8 carbon atoms; methacrylic esters containing 1–8 carbon atoms; or vinyl pyridine, and vinyl esters, for example, vinyl acetate.

In other embodiments of the present invention, the Group II salt includes an anion comprising one of sulfate, stearate or carbonate. In certain preferred embodiments, the Group II salt includes an anion comprising oxide, in for example Magnesium Oxide. The other preferred embodiments, the Group II salt includes an anion comprising hydroxide, for example Magnesium Hydroxide. In embodiments where the anion is hydroxide, the endothermic decomposition of the hydroxide to oxide plus water, are thought to play a beneficial role in the thermal management and in improving wetability during the CMP process.

To a first approximation, for given filler particle composition, size and shape, the thermal conductivity increases in proportion to the amount of filler present. For example, in certain preferred embodiments, the filler particles comprise at least about 20%, and more preferably about 40 to about 70% by weight, of the thermoconductive polymer. The size and shape of the filler particles also affect the extent of thermal conductivity of the thermoconductive polymer. For example, in certain preferred embodiments, the filler particles have a spherical shape. In other preferred embodiments, the filler particles have an average diameter ranging from about 50 $\mu$m to about 1 $\mu$m, and more preferably from about 5 $\mu$m to about 1 $\mu$m. In certain advantageous embodiments, the filler particles are incorporated substantially throughout the substrate so as to provide a uniform distribution of particles in the substrate.

FIG. 1 illustrates another embodiment of the present invention, a method 100 for preparing a heat conductive polishing pad for chemical-mechanical polishing. The method 100 comprises providing a substrate, at step 110, comprising for example, one or more of the above-mentioned substrates.

Next at step 120, one of the above-mentioned filler particles containing a Group II salt is blended into the substrate. Blending may be accomplished by any conventional technique sufficient to incorporate the filler particles in the substrate to thereby produce a thermoconductive polymer. In certain advantageous embodiments, the blending is sufficient to ensure incorporation of filler particles substantially throughout the substrate such that the concentration of particles in the substrate is uniform. In certain preferred embodiments, the thermoconductive polymer formed, at step 124, has a thermal conductivity (TC) of greater than about 1 Watts $m^{-1}$ $K^{-1}$ and an electrical volume resistivity (EVR) of greater than about $1\times10^{15}$ ohm $cm^{-3}$ at 25° C. Alternative embodiments of the present invention may include extruding the thermoconductive polymer from an extrusion apparatus, at step 126, to provide a thermoconductive foam pad for forming the polishing body. Conventional techniques are used to blow gas into the melt to produce a foam and then form the thermoplastic foam pad, as described below.

At step 130, a polishing body, suitable for polishing a semiconductor wafer or integrated circuit, is formed from the thermoconductive polymer. For example, polishing bodies may be formed by conventional techniques, such as melt extrusion of pellets, comprising the substrate and filler particles, into sheets, and laser or die cutting to form pads. The polishing bodies thus formed may have adhesive applied to the platen side and then directly coupled to a polishing platen. In certain alternative embodiments, at step 140, the polishing bodies may be coupled to a base pad located under the thermoconductive polymer, the base pad being coupled to the platen.

In certain preferred embodiments, the method 100 of preparing the heat conductive polishing pad may further include dissolving the filler particles, at step 150, in a supercritical fluid (SCF) to thereby produce the thermoconductive polymer. Any conventional apparatus and method may be used to produce the supercritical fluid of the present invention. Moreover, the specific combination of temperature and pressure required to produce a supercritical fluid are known to those of ordinary skill in the art. In one preferred embodiment, the substrate is exposed to a supercritical fluid, preferably including carbon dioxide, although other supercritical fluids are within the scope of the present invention. Alternatively, the supercritical fluid may include nitrogen ($N_2$).

In certain advantageous embodiments, an initiator, at step 155, is included with the supercritical fluid. The initiator preferably includes sufficient water such that the Group II salts, being used as filler particles, will include an anion substantially comprised of Hydroxide. To provide an example, the substrate, may be soaked in a carbon dioxide supercritical fluid, containing an initiator that includes water and a filler that includes Magnesium Oxide. As the supercritical fluid swells the substrate, the Magnesium Oxide is incorporated into the bulk of the substrate, and in the presence of water, is converted to Magnesium Hydroxide which is retained in the matrix of the substrate, serving as the filler particle.

In other preferred embodiments, the method 100 of preparing the heat conductive plastic polishing pad may further include exposing the polishing body, at step 160, to a precursor, for example, one or more of the above-mentioned precursors dissolved in a SCF, to thereby produce a modified polishing body. In such embodiments, the thermoconductive polymer has a grafted compound located substantially throughout the polymer. When carbon dioxide is used as the SCF, co-solvents, such as 0–10% aliphatic alcohol or aliphatic amide, are preferably included to modify the solubility of the carbon dioxide supercritical fluid.

In other embodiments, an initiator is included with the SCF to facilitate incorporation of the precursor into the substrate and formation of the grafted compound in the modified polishing body. The initiator is preferably water, when using inorganic compounds as the precursor. Alternatively, when using organic compounds as the precursor, initiators such as azo compounds, e.g., azobisisobutyronitrile (AIBN), or peroxides, e.g., t-butyl hydroperoxide, are preferred. The azo or peroxide initiators, are preferably 0.001 to 1% by weight. Continuing with the same example, the provided substrate may be soaked in a carbon dioxide SCF containing water as initiator, Magnesium Oxide (MgO) as filler, and the inorganic metal oxide tetraethoxy silane (TEOS) as precursor. As the SCF swells the substrate, the TEOS and MgO are incorporated into the bulk of the substrate and then in the presence of water, MgO is converted to $Mg(OH)_2$. Additionally, the TEOS precursor is hydrolyzed, and silica is incorporated into the bulk of the substrate to form a modified silica-laden plastic.

Alternatively, in certain embodiments, the thermoconductive polymer of the present invention may be first produced by providing a substrate, exposing the substrate to a precursor dissolved in a supercritical fluid to thereby produce a modified substrate. Subsequently, the modified substrate is melted and blended with filler particles and then and formed into a polishing body analogous to the above described steps.

The method 100 of preparing the heat conductive plastic polishing pad may further include exposing the polishing body to an initial plasma reactant, at step 170, to create a modified surface thereon. The polishing body is then exposed to a secondary plasma reactant, such as any of the precursor compounds described above, to thereby create a grafted surface-modified surface. Grafted surfaces produced from precursors, including inorganic metal oxides, control wetability compounds or organic compounds, such as those mentioned above, may be used. Continuing with the same example, the silica-laden and Magnesium Hydroxide filled polishing body may be exposed to a primary plasma reactant, such as Helium, to create a modified surface. Alternately primary plasma reactants, such as Neon and Argon are within the scope of the present invention. The modified surface may then be further exposed to a secondary plasma reactant, such as an allyl amine, to create a grafted surface on the modified surface. The resulting polishing body thus comprises a heat conductive polishing pad having its bulk properties modified, for example, making its surface harder and more hydrophilic by virtue of the above describe modifications. This in turn may enhance the polishing rate of oxides, or improve selectivity for polishing certain surfaces, for example copper surfaces.

Figure 2:
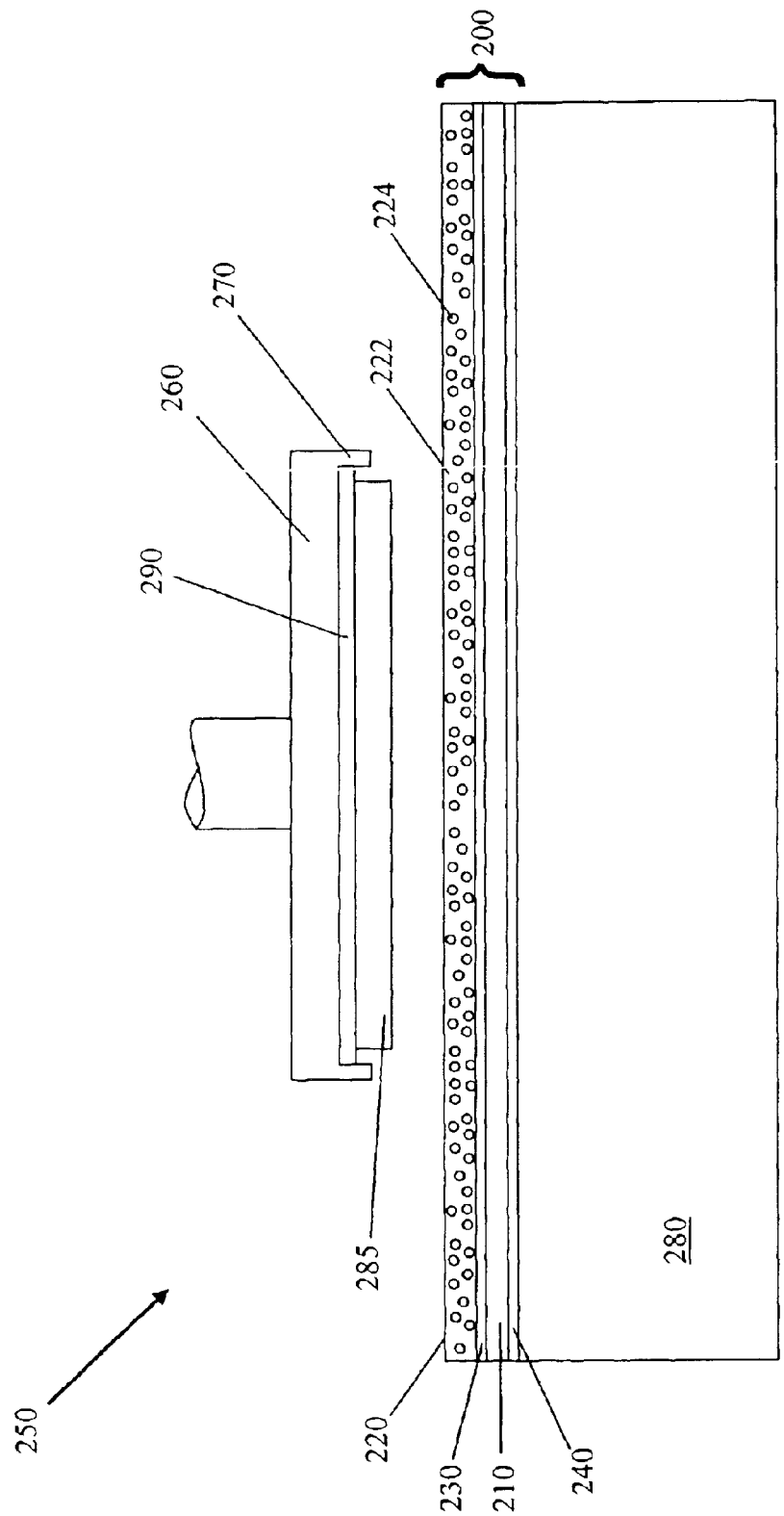
FIG. 2 illustrates a polishing apparatus, including a polishing pad fabricated using a thermoconductive polymer made according to the present invention.

Polishing pads fabricated from the thermoconductive polymer of the present invention may be employed in a CMP apparatus 250, one embodiment of which is displayed in FIG. 2. A polishing body 200, comprising a thermoconductive polymer 220 of the present invention, where the thermoconductive polymer 220 forms a polishing surface located over an optional base pad 210. Optionally, a first adhesive material 230, such as acrylate-based, silicone-based, epoxy or other materials, and methods, such as thermal welding, well known to those skilled in the art, may be used to couple the base pad 210 to the thermoplastic foam polymers 220. The resulting polishing pads may also have a second conventional adhesive material 240 applied to the platen side. The polishing pad may then be cleaned and packaged for use.

With continuing reference to FIG. 2, the polishing body 200 may then be employed in a variety of CMP processes by incorporating it into the polishing apparatus 250. The polishing apparatus 250 typically includes a conventional mechanically driven carrier head 260, a conventional carrier ring 270, a conventional polishing platen 280, and a polishing pad attached to the polishing platen 280. The pad comprises the polishing body 200 that includes the thermoconductive polymer 220 of the present invention. As noted above, the polymer 220 comprises a substrate 222 and filler particles 224. The filler particles 224 contain a Group II salt and are contained in the substrate 222. In certain advantageous embodiments, the particles 224 are incorporated substantially throughout the substrate 222. It is thought that the filler particles 224, in certain embodiments of the present invention, may enhance thermal management and chemical-mechanical polishing by a number of mechanisms. For example, the incorporation of filler particles 224 into the polishing body 200, may beneficial alter the structural characteristic of the polishing body 200 thereby enhancing its polishing characteristics in certain applications. The filler particles 224 may include an anion comprised of hydroxide capable of decomposing to oxide and water during chemical-mechanical polishing, thereby enhancing polishing planarization. Moreover, such decomposition may be endothermic, thus providing an additional means of thermal management.

The polishing body 200 may be attached to the polishing platen 280 by using the second adhesive 240, if so desired. The substrate to be polished 285, typically a wafer, may be attached to the carrier ring with the aid of a third a conventional adhesive 290. The carrier head 260 is then positioned against the polishing platen 280 to impart a polishing force against the polishing platen 280. The wafer substrate 285 is most often polished by an appropriate conventional slurry mixture that is dispensed on the polishing body 200. In certain embodiments, however, the slurry may be omitted.

With continuing reference to FIG. 2, in such polishing processes, a substrate wafer 285 may be polished by positioning the substrate wafer 285, having at least one layer, onto the above-described polishing apparatus 250, and polishing the layer against the thermoconductive polymer 220. In one embodiment, the substrate wafer 285 has at least one layer of material that is a metal layer. In particular embodiments, the metal layer may be copper or tungsten. In another embodiment, the substrate wafer 285 may be silicon, polysilicon or dielectric material located on a semiconductor wafer. Thermoconductive polymers 220 of the present invention are particularly suited for polishing in shallow trench isolation (STI), interlevel dielectrics, and metal interconnects in integrated circuit fabrication or other fabrication techniques where large areas of field oxide, other dielectrics or metal must be removed from the wafer 285 to produce a planar surface prior to subsequent processing. The thermoconductive polymers 220 of the present invention are also desirable for polishing metalization materials such as W, Ti, Cu, Al, and other metals, including Ru, Os, Co, Pt and Ta, as well as nitrides or barrier materials such as $Si_3N_4$, TaN, TiN. Moreover, the CMP apparatus 250 incorporating the thermoconductive polymer 220 of the present invention may be applied in a variety of polishing applications including MEMs, Magnetic heads, Disk Drives and Optical Elements.

Although the present invention has been described in detail, those skilled in the art should understand that they can make various changes, substitutions and alterations herein without departing from the spirit and scope of the invention.

What is claimed is:

1. A heat conductive polishing pad for chemical-mechanical polishing comprising:
    a polishing body including a thermoconductive polymer having a substrate with filler particles contained therein wherein said filler particles contain a Group II salt comprising magnesium.
2. The heat conductive polishing pad as recited in claim 1 wherein said polishing body further includes a base pad and said thermoconductive polymer forms a polishing surface located over said base pad and said thermoconductive polymer has a thermal conductivity of greater than about 1 Watts $m^{-1}$ $K^{-1}$ and an electrical volume resistivity of greater than about $1 \times 10^{15}$ ohm $cm^{-1}$ at 25° C.
3. The heat conductive polishing pad as recited in claim 1 wherein said substrate is selected from the group consisting of:
    polyurethane;
    polyolefin; and
    polyvinyl esters.
4. The heat conductive polishing pad as recited in claim 1 wherein said substrate is selected from the group consisting of:
    polyurea;
    polycarbonate;
    aliphatic polyketone;
    polysulfone;
    aromatic polyketone;
    6,6 nylon;
    6,12 nylon; and
    polyamide.
5. The heat conductive polishing pad as recited in claim 1 wherein said substrate is selected from the group consisting of:
    thermoplastic rubber; and
    melt-processible rubber.
6. The heat conductive polishing pad as recited in claim 1 wherein said substrate is selected from the group consisting of:
    polypropylene;
    polyethylene;
    crosslinked polyethylene;
    ethylene vinyl acetate; and
    polyvinylacetate.
7. The heat conductive polishing pad as recited in claim 1 wherein said thermoconductive polymer has a grafted compound located substantially throughout said polymer.
8. The heat conductive polishing pad as recited in claim 1 wherein said thermoconductive polymer has a modified surface and a grafted surface on said modified surface, said grafted surface comprising a grafted compound.
9. The heat conductive polishing pad as recited in claim 7 wherein said grafted compound includes an inorganic metal oxide.
10. The heat conductive polishing pad as recited in claim 8 wherein said grafted compound includes an inorganic metal oxide.
11. The heat conductive polishing pad as recited in claim 7 wherein said thermoconductive polymer has a foam structure and said grafted compound includes a controlled wettability compound.
12. The heat conductive polishing pad as recited in claim 8 wherein said thermoconductive polymer has a foam structure and said grafted compound includes a controlled wettability compound.
13. The heat conductive polishing pad as recited in claim 7 wherein said grafted compound includes an organic compound.
14. The heat conductive polishing pad as recited in claim 8 wherein said grafted compound includes an organic compound.
15. The heat conductive polishing pad as recited in claim 1 wherein said Group II salt includes an anion selected from the group consisting of:
    Sulfate;
    Stearate; and
    Carbonate.
16. The heat conductive polishing pad as recited in claim 1 wherein said Group II salt includes an anion comprised of oxide.

17. The heat conductive polishing pad as recited in claim 1 wherein said Group II salt is Magnesium Oxide.

18. The heat conductive polishing pad as recited in claim 1 wherein said Group II salt includes an anion comprised of hydroxide.

19. The heat conductive polishing pad as recited in claim 1 wherein said filler particles comprise at least about 20% by weight of said thermoconductive polymer.

20. The heat conductive polishing pad as recited in claim 1 wherein said filler particles have a spherical shape having an average diameter of less than about 50 μm to about 1 μm.

21. The heat conductive polishing pad as recited in claim 1 wherein said filler particles are incorporated substantially throughout said substrate.

* * * * *